May 21, 1968     O. BIHLMAIER     3,383,994
PHOTOGRAPHIC CAMERA WITH DISENGAGEABLE ELECTRONIC FLASH UNIT
Filed June 12, 1963     3 Sheets-Sheet 1

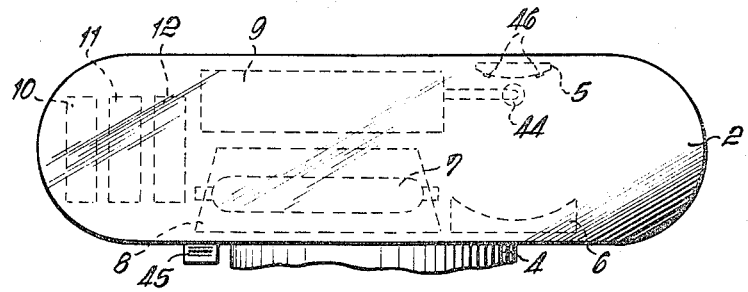
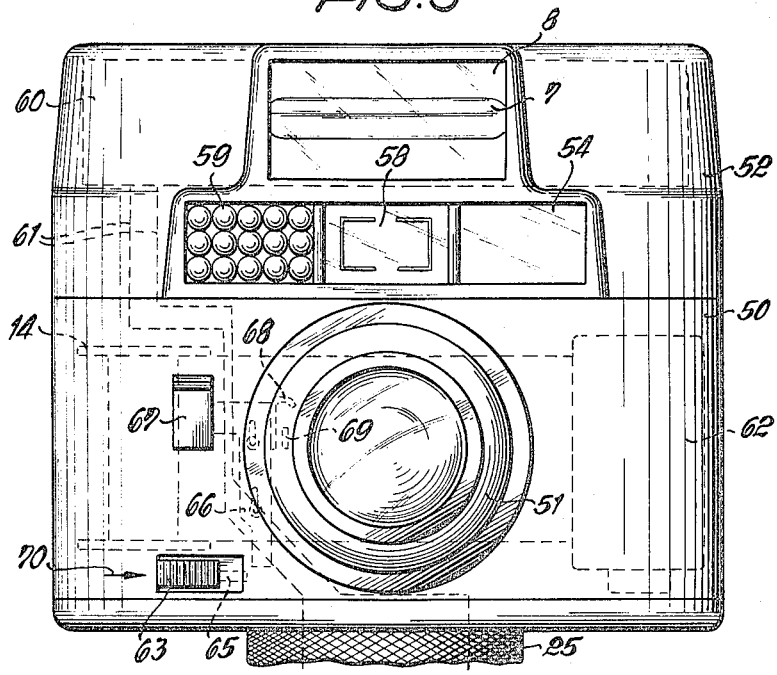
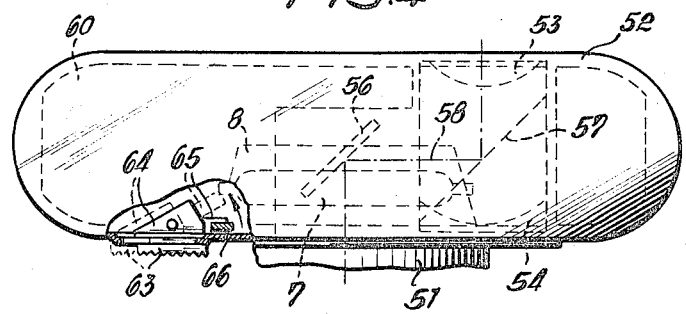

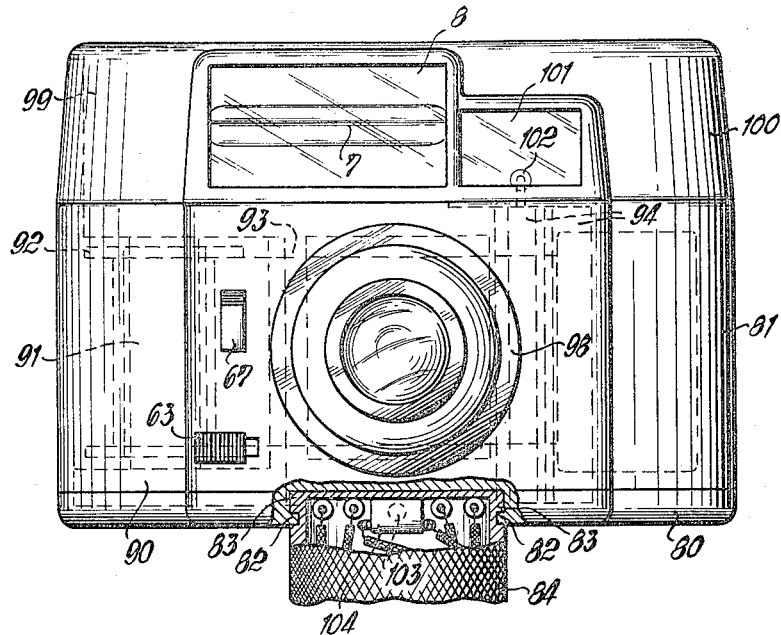
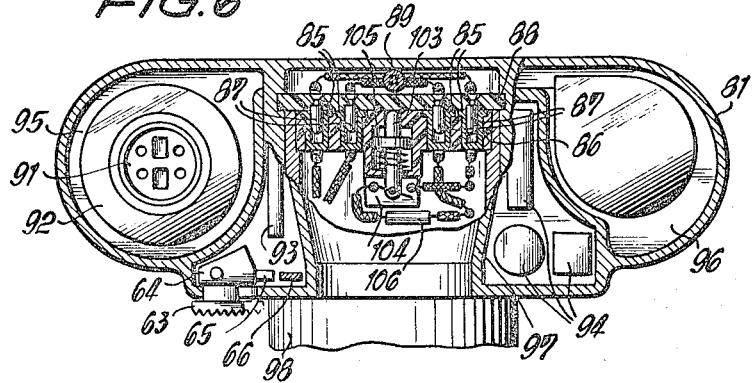
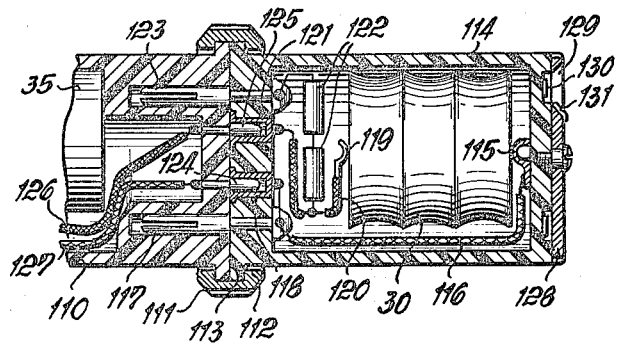

United States Patent Office 3,383,994
Patented May 21, 1968

3,383,994
PHOTOGRAPHIC CAMERA WITH DISENGAGE-
ABLE ELECTRONIC FLASH UNIT
Oskar Bihlmaier, Braunschweig, Germany, assignor to
Voigtlander A.G., Braunschweig, Germany, a corporation of Germany
Filed June 12, 1963, Ser. No. 287,359
Claims priority, application Germany, Jan. 25, 1963,
V 23,561
11 Claims. (Cl. 95—11.5)

ABSTRACT OF THE DISCLOSURE

A combined unit incorporating a camera and an electronic flash device is provided in which, of the usual components of the electronic flash device, at least the flash lamp and its reflector are fixedly incorporated into the camera, while other components of the electronic flash device including at least a power supply are mounted in a housing arranged for disengageable mechanical and electrical connection to the camera.

This invention relates to photographic cameras having electronic flash devices operatively associated therewith and, more particularly, to a photographic camera of this type in which an electronic flash device is structurally combined with a camera without any change in the size and shape of the camera per se while providing for easy and convenient handling of the combined unit.

In cameras of the type to which the present invention is directed, it is known to incorporate both the camera and an electronic flash device in a common housing which, however, differs substantially in size and shape from the normal camera. This makes a combined unit of this type cumbersome to handle.

It is further known to provide a combined camera and electronic flash device in which the camera and the electronic flash device are mechanically separate assemblies which are electrically interconnected. A further procedure is to divide the electronic flash device into two assemblies which are connected flexibly with each other. One of these assemblies is attached to the camera while the other assembly is arranged for pivoting to a position wherein it projects from the camera. In both of these latter cases, the electronic flash device is in the nature of an attachment to the camera and therefore interferes with easy handling of the camera, even though the electronic flash device may be divided into two assemblies.

In accordance with the present invention, a combined unit incorporating a camera and an electronic flash device is provided in which, of the usual components of the electronic flash device, at least the flash lamp and its reflector are fixedly incorporated into the camera, while other components of the electronic flash device are mounted in a housing arranged for disengageable mechanical and electrical connection to the camera, as by the use of disengageable electrical and mechanical coupling means.

In a preferred embodiment of the invention, the components of the electronic flash device, other than the flash lamp with its reflector, may be placed inside the hood of the camera, inside a hollow shaft for the film spools, in the space between the film spool chambers and the light tunnel connecting the objective to the film window, or in the general area of the bottom wall of the camera.

In a further preferred embodiment of the invention, the electrically and mechanically disengageable housing is designed as a bar-shaped handle for the camera. This bar-shaped handle may, in accordance with the invention, contain the power supply for the electronic flash device as well as a storage capacitor.

With the aforementioned distribution of the components of the electronic flash device in the available space within the camera and within the mechanically and electrically disengageable housing, those components which are placed within otherwise empty spaces in the camera may be placed therein without any substantial changes in the size or shape of the camera as compared with the size and shape the camera would have if it were not equipped with an electronic flash device. If the housing is designed as a handle for the camera, it even further facilitates the handling and operation of the camera.

For an understanding of the principles of the invention, reference is made to the following description of typical embodiments thereof as illustrated in the accompanying drawings.

In the drawings:

FIG. 2 is a top plan view of the camera shown in FIG. 1;

FIG. 3 is a front elevational view of another camera embodying the invention;

FIG. 4 is a top plan view of the camera shown in FIG. 3;

FIG. 5 is a front elevational view, partly broken away, of still another embodiment of the invention;

FIG. 6 is a top plan view, partly broken away, of the camera shown in FIG. 5; and FIG. 7 is a sectional view of a housing attachable to any of the cameras shown in FIGS. 1 through 6 and in which the housing contains the power supply for the electronic flash device as well as acting as a charging device for the power supply.

Figure 1:
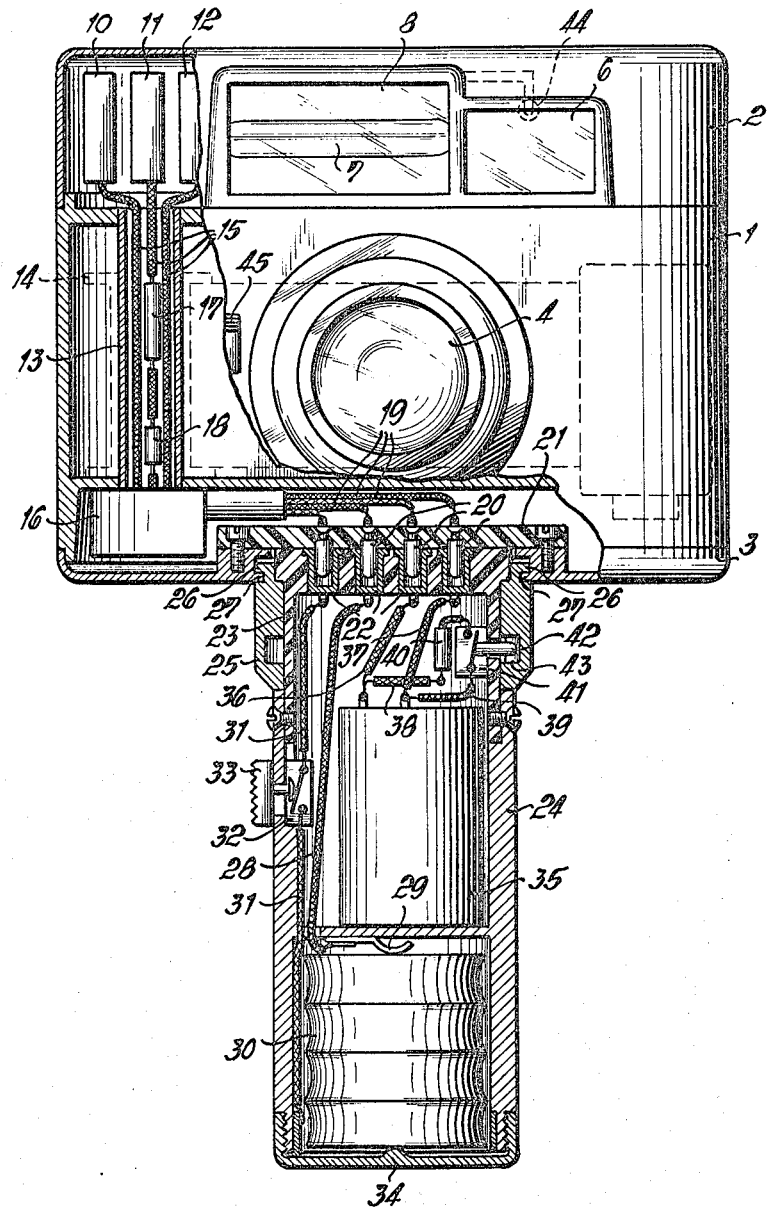
FIG. 1 is a front elevational view, partly broken away, of one embodiment of the invention in which the components of the electronic flash device are located partly in the camera and partly in a housing detachably connectable to the camera and designed as a handle for the latter.

Referring first to FIGS. 1 and 2, the camera is therein illustrated as including a body 1, a hood 2, and a base 3. The camera includes an objective 4, and a viewfinder with an eyepiece 5 and an objective 6. A flash lamp 7 and a reflector 8 of an electronic flash device are positioned inside hood 2 next to objective 6 of the viewfinder. Several of the other parts of the electronic flash device are also mounted within the camera. Those components mounted within the camera may include the power supply, a storage capacitor, the components of a D.C. inverter, the components of an automatic control for maintaining the charging voltage of the capacitor constant, an ignition means, and the flash lamp itself. All of these components are located within hood 2 of the camera as indicated by the reference characters 9, 10, 11 and 12.

A cable 15 extends through a tube 13 forming a hollow shaft for a film spool 14, and connects the abovementioned components to a further flash device component 16 located in the bottom section of body 1 of the camera. Additional components of the electronic flash device, such as resistors or capacitors 17 and 18, also are located within tube 13. Cables 19 extend from component 16 to contact pins 20 which are mounted in a dielectric plate 21 secured to the lower section of body 1. Pins 20 are arranged to engage jacks 22 mounted in a projection 23 of housing 24, projection 23 being formed of dielectric material.

Housing 24 is designed as a bar-shaped handle for the camera, and contains additional components of the electronic flash device. Housing 24 is detachable connectable to body 1 of the camera by means of a coupling ring 25 mounted on projection 23 and provided with bayonet type formations 26 interengageable with cooperating bayonet type formations 27 on base 3 of the camera body. By suitable rotation of ring 25, the mechanical coupling 26, 27 between housing 24 and body 1 can be engaged or disengaged. If the mechanical coupling is released or disengaged, the parts 1 and 24 can be bodily separated by pulling housing 24 from body 1 of the camera, and this will simultaneously disconnect jacks 22 from pins 20. By movements of the two parts in the opposite directions, the electrical and mechanical connections are re-established, as indicated by the position of the parts as shown in FIG. 1.

A cable 28 electrically connects one jack 22 to a contact spring 29 supported in housing 24 in insulated relation therein, and which is engageable with one terminal or pole of power supply 30. This power supply may comprise a nickle-cadmium storage battery of several cells. A switch 32 is incorporated in a connection 31 extending between the other pole or terminal of power supply 30 and another jack 22. Switch 32 is actuated by a movable operator or button 33 projecting externally of housing 24. In the open position of the switch shown in FIG. 1, the current flow from power supply 30 to the components of the electronic flash device is interrupted. Access to the space within housing 24, and containing the power supply 30, is provided by means of a threaded cover 34.

Housing 24 also encloses and supports a storage capacitor 35 having a pair of terminals connected to additional jacks 22 by cables 36 and 37. If the electronic flash device is activated and if storage capacitor 35 is charged, a high D.C. voltage is applied to those jacks 22 and pins 20 which are electrically connected to cables or conductors 36 and 37. If the housing 24 and camera 1 were then to be separated from each other, the sockets 22 and pins 20 are freely accessible and could inflict a painful electric shock if they were touched. To avoid this, a special switch device is provided in addition to the usual and necessary components of electric flash device. This switch device causes capacitor 35 to be discharged, in advance, every time housing 24 is detached from body 1 thus to remove the potential from pins 20 and jacks 22.

To effect this, the terminals of capacitor 35 are connected through conductors 38 and 39 and a resistor 40, with a switch 41. Switch 41 has an operator 42 cooperable with a cam 43 on the inner surface of coupling ring 25. This cam is so disposed that, if coupling ring 25 is rotated into a position where the bayonet lock 26, 27 is released, cam 43 moves operator 42 to a position closing switch 41. This completes a circuit for discharging capacitor 35 through resistor 40.

An indicator light in the form of a glow lamp 44, and which is known per se in electronic flash devices, is positioned in the path of light rays entering viewfinder 5, 6. When this lamp 44 is lit, it indicates that the device is ready for flashing. Viewfinder 5, 6 is designed in a manner known per se (and hence not described in detail), as an Albada viewfinder with a picture limiting frame 46 provided on the surface of a lens 5 facing lens 6. Frame 46 is imaged into the path of light rays in the viewfinder by means of a partially permeable concave mirror provided on the face of lens 6 directed toward lens 5. Due to the proximity of lamp 44 to frame 46, lamp 44 is visible to one looking through the viewfinder, in addition to the frame 46.

The electronic flash device is connected to the synchro-contact of the camera shutter so that flash lamp 7 is illuminated if shutter button 45 is actuated, provided that the electronic flash device has been activated by operation of switch 33 and glow lamp 44 is illuminated.

It is known that an interval of approximately ten seconds elapses between the instant of activating the flash device and its readiness to flash, and that such an interval also elapses between one flash and the time when the device is ready for a second flash. With the camera as shown in FIGS. 1 and 2, if glow lamp 44 were ignored, it would be possible to operate the shutter while the flash device is not yet ready to operate.

This is prevented in the camera shown in FIGS. 3 and 4, and which has an interlocking arrangement preventing such inadvertent operation of the camera shutter. The camera shown in FIGS. 3 and 4 is constructed so that it is substantially similar to the camera of FIGS. 1 and 2, with some of the components of the electronic flash device being mounted in the camera body while others are mounted in a housing which is disengageably attachable to the camera. FIG. 3 illustrates only a portion of coupling ring 25 of this housing, and the housing and the coupling ring may correspond to the same parts in the camera of FIGS. 1 and 2.

Camera 50 of FIGS. 3 and 4 includes an objective 51 and a hood 52 in which is mounted a range finder having an eyepiece 53 and two windows 54 and 55. The broken lines in FIG. 4 indicate a rotatable mirror 56 and a fixed semipermeable mirror 57, the latter of which deflects the range finder light ray 58 to eyepiece 53. Next to objective 55 there is located a honeycomb lens 59 positioned in front of the light sensitive cell of an electric exposure meter which is not shown in detail.

Flash lamp 7 and reflector 8 are positioned above the range finder and exposure meter, but within hood 52. Components 60 of the electronic flash device are also located in hood 52, and wires 61 connect component 60 to other components located in camera 50 in the lower section thereof, particularrly in the empty space between the chambers for film spools 14 and 62 and the light tunnel connecting the objective to the film window. Other components of the electronic flash device are located, in the same manner as described in connection with FIGS. 1 and 2, in housing 24 disengageably attachable to camera 50.

However, in contrast to the arrangement shown in FIGS. 1 and 2, the switch for activating and deactivating the electronic flash device, rather than being located in housing 24, is located in camera body 50. The operator for this switch is indicated at 63, and is shown in the disconnect position in FIG. 3. A solenoid 64 is attached to a slide connected to switch button 63, and is further connected in the circuit of the electronic flash device in the same manner as is the glow lamp 44 of FIGS. 1 and 2. Current will flow throughh solenoid 64, therefore, only if the electronic flash device is in a state where it is ready for flashing.

The armature of solenoid or relay 64 is in the form of a latch 65 which can be moved into the path of a shutter release slide 66 having attached thereto a shutter release button 67 and a catch 68 for the release means 69 of the shutter.

In the position of these parts shown in FIG. 3, button 63 is in the "off" position for the electronic flash device. Relay or solenoid 64 with its latch or locking lug 65 is, at this time, outside the path of movement of shutter release slide 66. Consequently, catch 68 can act without interference on shutter release 69 in the event photographs are to be taken without using the flash device, and simply by operation of shutter release button 67.

If a flash picture is to be taken, the electronic flash device first must be activated by moving switch button 63 in the direction of arrow 70. Latch 65 of the solenoid then moves into the path of movement of shutter release slide 66, as indicated in FIG. 4 in solid lines so as to prevent movement of the shutter release slide 66. When the electronic flash device has reached a state where it is ready to flash, solenoid 64 retracts latch 65 to the position where it is out of the path of movement of shutter release slide 66, as indicated by broken lines in FIG. 4. If the shutter is now released, flash lamp 7 will be illuminated. Afterwards, latch 65 is again projected during the time required for the flash device to re-attain a state where it is ready to flash, with the latch 65 being moved back into the path of movement of shutter release slide 66 to prevent actuation of the latter.

In the embodiment of the invention shown in FIGS. 5 and 6, the components of the electronic flash device are again located partly in the camera and partly in the housing detachably connectable to the camera. In those embodiments of the invention shown in FIGS. 1 through 4, the housing was attached to the camera by a movement perpendicular to the bottom surface of the camera. However, in the embodiment of the invention shown in FIGS. 5 and 6, the camera 81 has a base 80 on which are guide or slide rails 82 which are perpendicular to the plane of the drawing. Rails 82 are interengageable with a mating slide or guide means 83 forming part of a housing 84 also designed as a bar-shaped handle.

As already described in connection with FIG. 1, a number of the components of the electronic flash device are located in housing 84. The wires from these components lead to sockets 85 which are located in a dielectric plate 86 attached to housing 84. When housing 84 is mounted on the camera by interengagements of rails 82 and slide 83, pins 87 enter the sockets 85 at the end of the engagement movement. Pins 87 are mounted in a dielectric plate 88 forming part of the camera 81. Wires which connect with pins 87 are combined into a cable 89 which leads to those other components of the electronic flash device which are located in body 81 of the camera.

Components 90 are in the area of the base of the camera, components 91 are located in a hollow shaft 92 for the film spool, and components 93 and 94 are positioned in the space between the chambers 95 and 96, for the film spools, and the light shaft or tunnel 97 connecting objective 98 to the film window. Additional components 99 are located in hood 100 of the camera, at the front of which is the flash lamp 7 with the reflector 8 positioned next to the viewfinder window 101. A lamp 102 is located in the path of light rays entering the viewfinder, to indicate the readiness of the device to flash, and this lamp functions in the same manner as described with respect to the lamp 44 of FIG. 1.

FIG. 6 also illustrates the control switch for the electronic flash device, and this is of the same type as described in connection with FIGS. 3 and 4. The switch has an operating button 63 and includes a relay 64 with latch 65 cooperable with the shutter release slide 66. The parts are illustrated in the "off" position of the switch. In the camera shown in FIGS. 5 and 6, the mechanical interlock 65, 66 is provided to prevent operation of the shutter release button 67 unless the electronic flash device is ready to function. This interlock is released when the device is ready to function, and such readiness to function is also indicated by lamp 102 which then becomes illuminated.

The camera of FIGS. 5 and 6 also comprises the switch device, mentioned in connection with FIGS. 1 and 2, which discharges the storage capacitor, if the latter is charged, when housing 84 is to be removed from camera 81, to prevent any injury to the user which might be caused by touching the accessible contact pins 87 or jacks 85.

Referring particularly to FIG. 6, a pin 103 is movably supported in dielectric plate 86 of housing 84. One end of pin 103 holds switch 104 in the open position, and the other end of the pin is engaged against dielectric plate 88 on the camera and held thereagainst by a compression spring 105. When housing 84 is pulled away from camera 81, plates 86 and 88 are separated. When this happens, compression spring 105 moves pin 103 into a position in which the end of the pin, which up until that time had been engaged with the plate 88, can extend from plate 86 an amount sufficient to close switch 104. In the same manner as described for the switch 41 of FIG. 1, this closes a discharge circuit for the condenser through existing connections and through a resistor 106. When housing 84 is again connected to camera 81, pin 103, at the end of the engaging operation, is again moved into the position of FIG. 6, by engagement with plate 88, to thereupon open the switch 104.

FIG. 7 illustrates a special design of the end of the housing engageable with the camera, and which design can be applied to any one of the housings shown in FIGS. 1 through 6. In the arrangement shown in FIG. 1, the space for the power supply 30 can be closed by the screw cover 34, as already described. After this cover is removed, the power supply is accessible and can, if necessary, be exchanged or recharged.

In accordance with the arrangement shown in FIG. 7, the part of the housing containing the power supply is an individual part separable from the rest of the housing and designed as a charging device for the power supply. The housing, which as a whole is designed as a bar-shaped handle for the camera, is illustrated in FIG. 7 in a position in which it is rotated by 90 degrees relative to the housing positions of FIGS. 1, 3 and 5. The outer end of the housing is indicated at 110, and the opposite end of the housing can be attached to the camera in the manner explained in connection with FIGS. 1, 5 and 6. Housing end 110 is provided with a coupling ring 111 having coupling lugs 112 engageable with mating lugs 113 on a housing 114 for the power source, housing part 114 being made of dielectric material. Power source 30 is positioned within housing part 114 and has one end or terminal engageable with the spring contact 115 from which a cable 116 is connected to a contact pin 117 and also to a contact socket 118. A spring contact 119 engaging the other terminal of power source 30 is connected by a conductor 120 to another contact bushing or socket 121. Contact 119 is connected with a contact pin 123 through electrical components 122 which are used for the charging operation and which may comprise, for example, a resistor and a diode. While the contact pins 117 and 123 extend, without any electrical effect, into bores in housing 110 in the position shown in the drawing, the contact pins 124 and 125, which are fixedly mounted in housing 110, engage contact bushings or sockets 118 and 121. Cables 126 and 127 which are connected to pins 124 and 125 establish electrical connection between power source 30 and those components of the electronic flash device located in housing 110 and in the camera. The only one of these components which is shown is illustrated as a portion of a storage capacitor 35.

When power source 30 is exhausted, housing 114 is separated from housing 110 by operation of coupling ring 111. Contact pins 117 and 123 are then freely accessible and can be inserted into a convenience outlet for the purpose of charging power supply 30.

FIG. 7 further shows a calculator which makes it possible to determine easily the adjustment of the iris diaphragm of the camera for the distance at which any photograph is taken. For this purpose, a disk 128 is rotatably attached to the bottom wall of housing 114, and has a window 129 through which it is possible to read a scale 130 on housing 114. In cooperation with a scale 131 on disk 128, scale 130 indicates a required setting of the camera.

While the drawings illustrate the housing attachable to the camera as being attached adjacent the center of the base of the camera and beneath the axis of the objective, it is possible, within the scope of the invention, to attach the housing to the camera at any other position and, for example, on an extension of the axis of one of the film spools. In selecting the position where the camera and the housing are to be joined, the point where the eyepiece of the finder is located should be taken into consideration. If the point of attachment is directly below the eyepiece of the finder, the housing and the hand holding it can interfere with one looking through the finder. It is therefore advantageous if, as illustrated in FIGS. 1, 3 and 5, the eyepiece of the viewfinder and the point of attachment of the housing are displaced laterally with respect to each other so that the extended center line of housing 24 has, as shown in FIG. 1, a position offset laterally from the perpendicular to optical axes 5, 6 of the viewfinder. If, for example, the eyepiece of the viewfinder is in the center of the rear wall of the hood of the camera, the point of attachment of the component housing preferably should be beneath the chambers for the film spools in the camera.

In the embodiment of FIG. 1, the only functional components of the electronic flash device located in the disengageable housing are power supply 30 and storage capacitor 35. However, it is within the scope of the invention to position other components of electronic flash device in the disengageable housing and handle unit, either replacing the power supply 30 and capacitor 35 or in addition to both or only one of these components. The controlling factor for the relative distribution of the components of the electronic flash device between the camera and the disconnectable housing is whether or not the usual outlines of the camera will be changed. As little a change as necessary is desirable in order to make the handling of the combined instrument as simple as possible. In view of the weight distribution, therefore, heavy components preferably are placed in the disengageable housing. This has the advantage that a camera built in accordance with the invention differs but little in size and weight from other cameras of a usual design, if it is used without flash illumination of the scene to be photographed.

While specific embodiments of the invention have been shown and described in detail to illustrate the application of the principles of the invention, it will be understood that the invention may be embodied otherwise without departing from such principles.

What is claimed is:

1. In combination, a camera comprising a casing having a base, a separable housing having the configuration of a hand grip, components permanently mounted within said casing and components within said housing, adapted to take pictures selectively in natural light and by electronic flash, the camera casing components being capable by themselves of taking pictures in natural light, the camera casing components including at least a flash lamp and reflector among the components required for taking pictures by electronic flash, the housing components including at least a power source among the components required for taking pictures by electronic flash and interengageable mechanical and electrical releasable coupling means having mating portions respectively on said casing base and said housing cooperable when said base and said housing are in abutment to directly mechanically couple said housing releasably to said casing with the upper end of said housing abutting the lower end of said casing and with said casing and housing in vertical alignment and thereby to electrically couple the electronic flash components to each other in a manner rendering said electronic flash device operative when said housing is coupled to said casing, said electrical coupling means including one set of contacts carried by said base of said camera casing and a second set of contacts carried by said upper end portion of said housing and engaging said one set of contacts, respectively, to provide the electrical coupling of said electronic flash components to each other when said housing is mechanically coupled to said base of said camera casing, said camera casing having in its interior electrical conductors extending from said one set of contacts to the electronic flash therein, said housing carrying in its interior electrical conductors extending from said second set of contacts to the electronic flash components therein, said camera including in addition to said casing, an objective, a film window, a light tunnel interconnecting the objective and the film window, and film spool chambers spaced from said tunnel; and a tubular film spool shaft mounted in at least one of said film spool chambers; and means mounting at least some of said one group of electrical components of said flash device within said tubular film spool shaft.

2. In a combination as recited in claim 1, means mounting some of said one group of electrical components of said flash device in the space between the spool chambers and the light tunnel.

3. In a photographic camera of the type having structurally incorporated therewith a multi-component electronic flash device, with the components of the flash device including a flash lamp and a reflector therefor: a camera including a casing; means mounting at least said flash lamp and its reflector, of said components, in said casing; a housing; interengageable mechanical coupling means on said casing and said housing cooperable to couple said housing releaseably to said casing; cooperating first and second electrical contact means, on said casing and on said housing, respectively, interengageable upon mechanical coupling of said housing to said casing; conductor means connecting said flash lamp to said first contact means; means mounting others of said components in said housing; and conductor means connecting said other components to said second contact means; whereby said flash lamp is electrically connected to said other components upon mechanical coupling of said housing to said casing, said interengageable mechanical coupling means comprising a ring rotatably mounted adjacent one end of said housing and having bayonet joint formations cooperable with bayonet joint formations on a wall of said casing upon relative rotation of said ring.

4. In a photographic camera of the type having structurally incorporated therewith a multi-component electronic flash device, with the components of the flash device including a flash lamp and a reflector therefor: a camera including a casing; means mounting at least said flash lamp and its reflector, of said components, in said casing; a housing; interengageable mechanical coupling means on said casing and said housing cooperable to couple said housing releaseably to said casing; cooperating first and second electrical contact means, on said casing and on said housing, respectively, interengageable upon mechanical coupling of said housing to said casing; conductor means connecting said flash lamp to said first contact means; means mounting others of said components in said housing; and conductor means connecting said other components to said second contact means; whereby said flash lamp is electrically connected to said other components upon mechanical coupling of said housing to said casing, said interengageable mechanical coupling means comprising first slide means extending transversely of a wall of said casing and a second slide means on an end of said housing slidably interengageable with said first slide means to couple said housing to said casing.

5. In a photographic camera of the type having structurally incorporated therewith a multi-component electronic flash device, with the components of the flash device including a flash lamp and a reflector therefor: a camera including a casing; means mounting at least said flash lamp and its reflector, of said components, in said casing; a housing; interengageable mechanical coupling means on said casing and said housing cooperable to couple said housing releaseably to said casing; cooperating first and second electrical contact means, on said casing and on said housing, respectively, interengageable upon mechanical coupling of said housing to said casing; conductor means connecting said flash lamp to said first contact means; means mounting others of said components in said housing; and conductor means connecting said other components to said second contact means; whereby said flash lamp is electrically connected to said other components upon mechanical coupling of said housing to said casing, the components of the electronic flash device including a capacitor connected to said electrical contact means; a discharge circuit for said capacitor; a normally open switch in said discharge circuit; and means operable, responsive to uncoupling of said housing from said casing, to close said normally open switch to discharge said condenser.

6. In a photographic camera, as claimed in claim 3, the components of the electronic flash device further including a capacitor connected to said electrical contact means; a discharge circuit including said capacitor; a normally open switch included in said discharge circuit; and means operable upon rotation of said ring in an uncoupling direction to close said normally open switch to discharge said capacitor.

7. In a photographic camera, as claimed in claim 4, the components of the electronic flash device further including a storage capacitor connected to said electrical contact means; a discharge circuit including said capacitor; a normally open switch in said discharge circuit; means biasing said switch to the closed position; and cooperable means in said housing and said casing interengageable upon coupling of said housing to said casing to move said switch to the open position against the biasing means, said biasing means, upon uncoupling of said housing from said casing, moving said switch to the closed position to complete said discharge circuit.

8. In a photographic camera of the type having structurally incorporated therewith a multi-component electronic flash device, with the components of the flash device including a flash lamp and a reflector therefor: a camera including a casing; means mounting at least said flash lamp and its reflector, of said components, in said casing; a housing; interengageable mechanical coupling means on said casing and said housing cooperable to couple said housing releasably to said casing; cooperating first and second electrical contact means, on said casing and on said housing, respectively, interengageable upon mechanical coupling of said housing to said casing; conductor means connecting said flash lamp to said first contact means; means mounting others of said components in said housing; and conductor means connecting said other components to said second contact means; whereby said flash lamp is electrically connected to said other components upon mechanical coupling of said housing to said casing, a shutter release means included in said camera and including a shutter release component movable upon operation of the shutter release means; the components of the electronic flash device including a solenoid having a normally extended plunger movable into the path of movement of said shutter release component to prevent movement of the latter; said solenoid being energized when said electronic flash device is ready for flashing, to retract its plunger from the path of movement of said shutter release component.

9. In a photographic camera, as claimed in claim 8, the components of the electronic flash device including a switch operable to activate the device; said switch including an operator movable toward and away from the path of movement of said shutter release component; said solenoid and its plunger being secured to said operator for movement therewith, and said plunger extending into the path of movement of said shutter release component when said switch operator is moved to a position activating the electronic flash device.

10. In a photographic camera and electronic flash device combination, said electronic flash device having two groups of components one of which includes at least a flash lamp and a reflector therefor and the other of which includes at least a power source, said camera including a camera having the configuration of a casing of a camera which is not combined with an electronic flash device; means mounting said one group of components permanently in said casing without changing said configuration thereof, said camera being of full utility without said electronic flash device; a housing containing said other group of components and having the configuration of a hand-grip and interengageable mechanical and electrical releasable coupling means having mating portions respectively on said casing and said housing cooperable to mechanically couple said housing releasably to said casing and to electrically couple said groups of components to each other in a manner rendering said electronic flash device operable when said housing is coupled to said housing, the components of the electronic flash device including an electrically energized indicator which is energized when the electronic flash device is in a state of readiness; said indicator being positioned in the camera in the field of view of a user of the camera.

11. In a combination, as claimed in claim 10, said camera including a viewfinder; said indicator comprising a glow lamp positioned in the field of view of one looking into said viewfinder.

References Cited

UNITED STATES PATENTS

| 2,949,838 | 8/1960 | Skalabrin | 95—86 |
| 2,971,432 | 2/1961 | Blank | 88—16 |
| 2,989,906 | 6/1961 | Rentschler | 95—11 |
| 3,118,613 | 1/1964 | Irwin | 240—1.3 |
| 3,120,632 | 2/1964 | Hopt | 240—10.6 |
| 3,134,547 | 5/1964 | Kapteyn | 240—1.3 |
| 3,187,341 | 6/1965 | Kubota | 352—174 |

FOREIGN PATENTS

| 1,104,822 | 4/1961 | Germany. |

JOHN M. HORAN, *Primary Examiner.*